Aug. 8, 1967    A. G. HEWITT ET AL    3,334,553
METHOD OF PRODUCING FLEXIBLE BAG
Original Filed Oct. 26, 1962    5 Sheets-Sheet 1

INVENTORS
ALFRED G. HEWITT
HARRY P. EICHIN
BY Sheldon H Parker
ATTORNEY

INVENTORS
ALFRED G. HEWITT
HARRY P. EICHIN
BY Sheldon H Parker
ATTORNEY

United States Patent Office 3,334,553
Patented Aug. 8, 1967

3,334,553
METHOD OF PRODUCING FLEXIBLE BAG
Alfred G. Hewitt, Stuart, Fla., and Harry P. Eichin, Western Springs, Ill., assignors to Union Carbide Corporation, a corporation of New York
Original application Oct. 26, 1962, Ser. No. 233,258, now Patent No. 3,208,661, dated Sept. 28, 1965. Divided and this application Dec. 7, 1964, Ser. No. 416,409
2 Claims. (Cl. 93—35)

ABSTRACT OF THE DISCLOSURE

A novel method for producing a sanitary sealed bag with an integral filling-pouring spout from a flattened tubular film. One end of the flattened tube is split transversely in order to form a flap thereon. The flap is then spirally wound to form a tubular spout opening in the tube, this is followed by sealing together the adjacent layers of the tubular spout and sealing the first end of the flattened tube transversely from the spout and sealing the second end of the flattened tube transversely.

This application is a division of patent application, Serial Number 233,258, filed October 26, 1962, now Patent Number 3,208,661, issued September 28, 1965.

This invention relates generally to flexible bags and, more particularly, to method of producing flexible bags having integral filling-pouring spouts, from flattened flexible tubing.

A package which has been developed heretofore for shipping and dispensing liquid, pasty, or pulverulent materials uses a plastic liner interior to a corrugated paperboard container. The liner for this package is made of thermoplastic film which is folded and sealed to form a closed bag. Resistance to stress fatigue of the liner at the liquid level line is provided by making the wall of the liner of a plurality of plies of thermoplastic film. In such a construction, the innermost ply is made of tubular film, and the outer plies are made of sheet film sealed to the inner tube. In order to fill and empty the bag, a rubber tube is usually inserted and sealed into one corner thereof. However, because of the tendency of the plastic film to block, it is difficult to open a passage provided in the sealed liner for inserting the filling tube therein. Also, when a multiwall liner is used, an operator may inadvertently place the filling tube between the inner and outer plies of the liner. When such a bag is later filled with liquid, it is thus used as a singlewall liner and frequently breaks in shipping.

An object of the present invention is to provide an economical method for making sanitary sealed bags with an integral filling-pouring spout from flattened tubular film.

Another object is to provide a method for automatic machine fabrication of multiple ply, sealed, flattened bags with integral filling-pouring spouts, the interior construction being made from flattened thermoplastic tubing.

Other aims and advantages of the invention will be apparent from the following description and appended claims.

Figure 1:
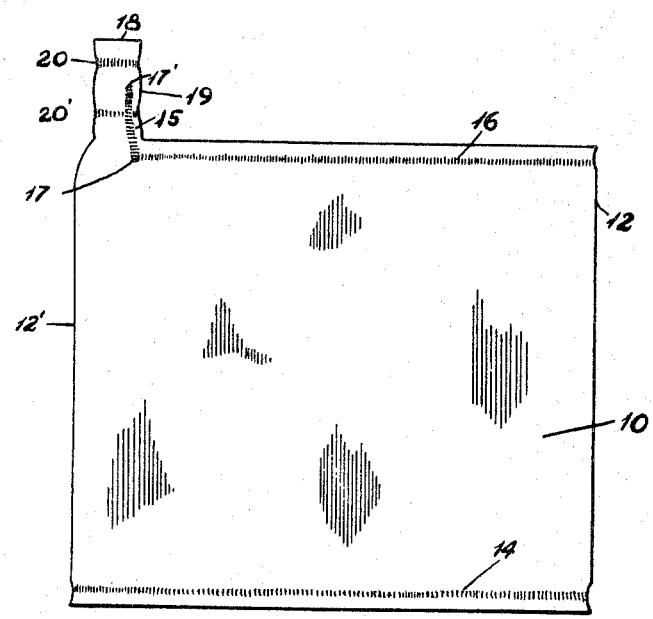
Figure 2:
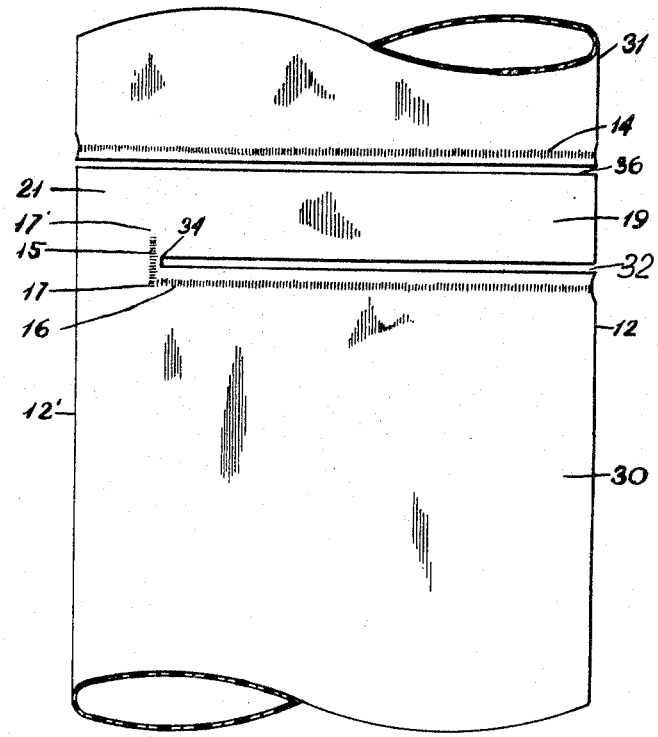
Figure 3:
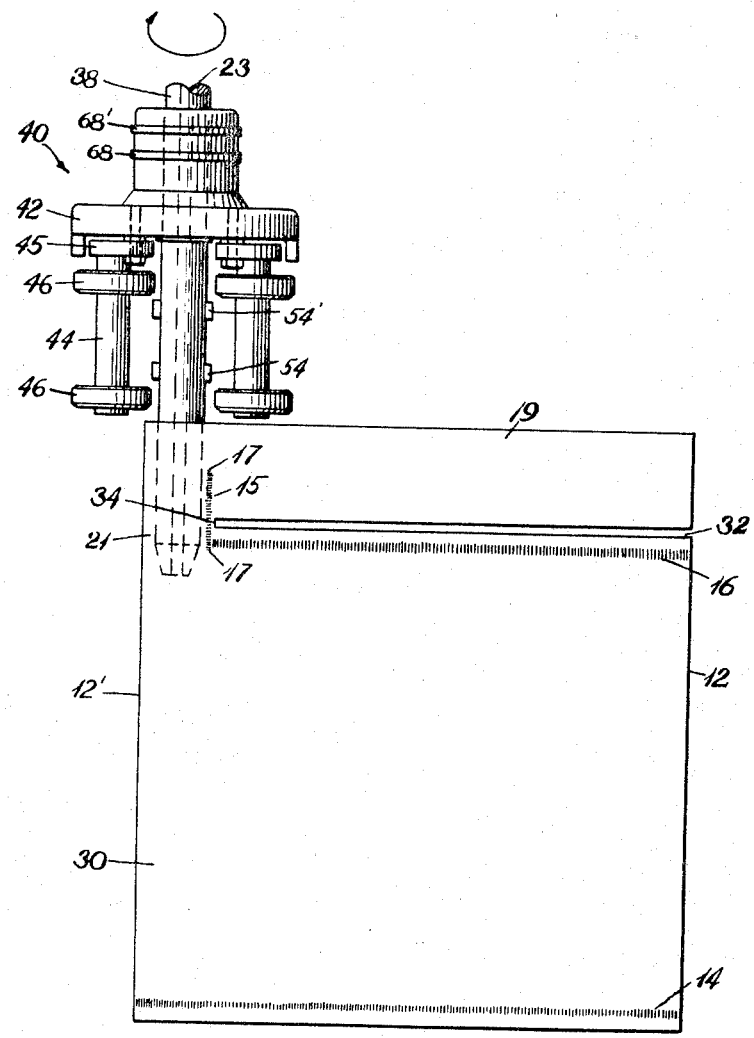
Figure 4:
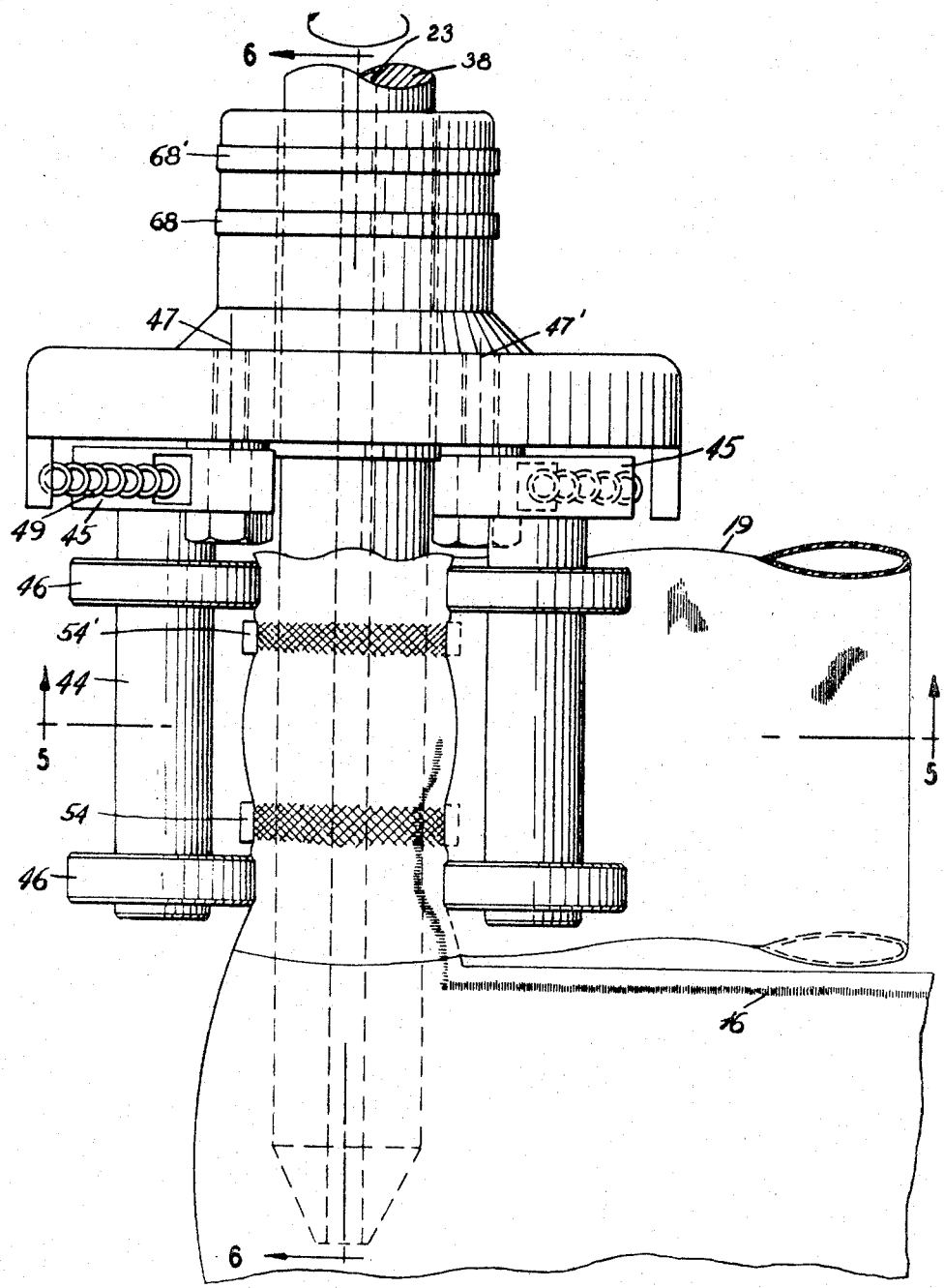
Figure 5:
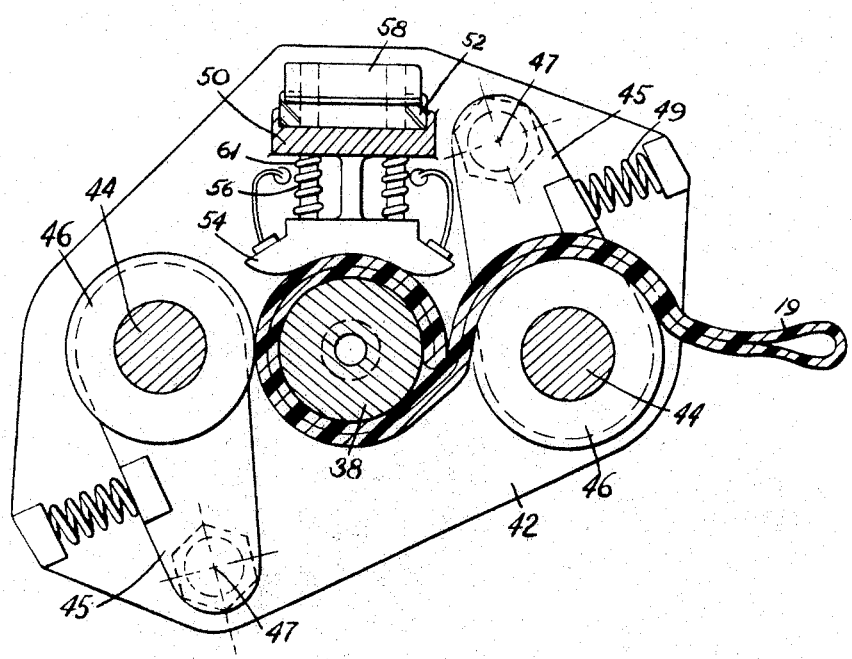
Figure 6:
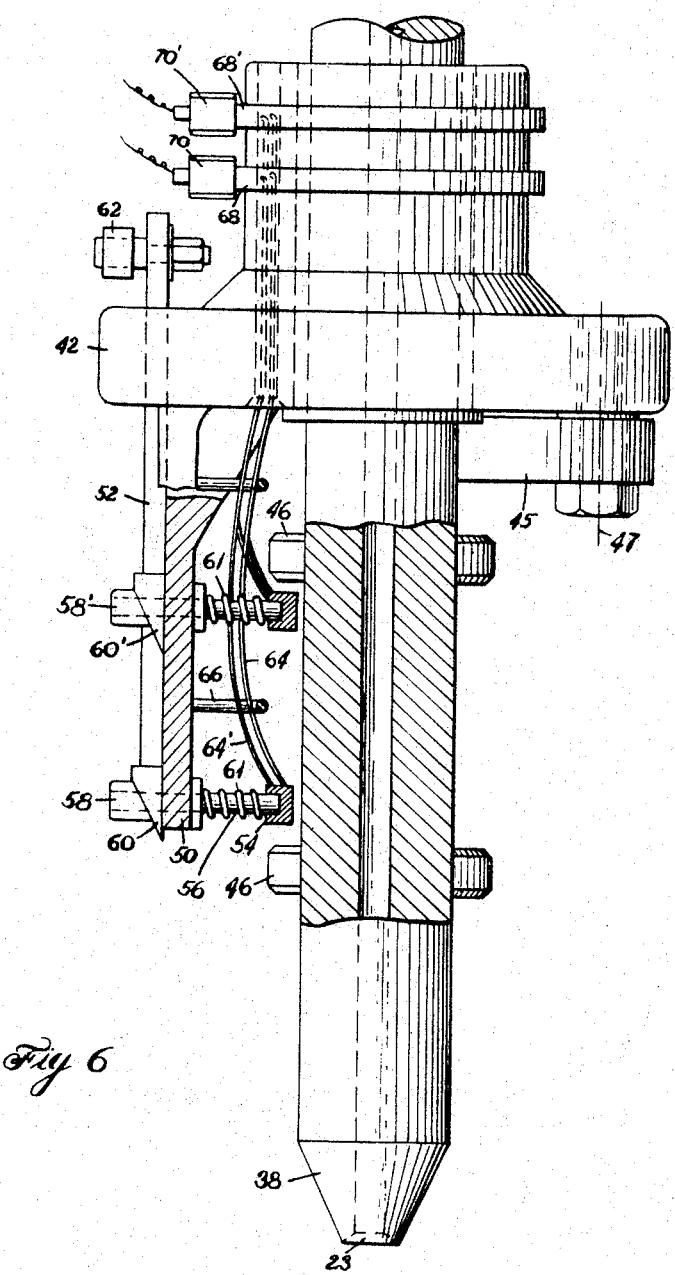

In the drawings:
FIGURE 1 is a top view of a finished sealed liner bag with an integral spout;
FIGURE 2 is a plan view illustrating the first step in the formation of the seals and spout;
FIGURE 3 is a plan view illustrating the second step in the formation of the spout;
FIGURE 4 is a plan view illustrating the third step in the formation of the spout;

FIGURE 5 is a section taken along line 5—5 of FIGURE 4; and
FIGURE 6 is a section taken along line 6—6 of FIGURE 4.

In accordance with the present invention, a bag is produced from a flattened flexible tube, by the steps of slitting a first end of the flattened tube transversely to form a flap thereon, spirally winding said flap to form a tubular spout opening into said tube, sealing together the adjacent layers of said tubular spout, sealing said first end of said flattened tube transversely from said spout, and sealing the second end of said flattened tube transversely.

The flexible tube is preferably a seamless tube of thermoplastic film which is readily heat sealable. However, this invention is equally applicable to other flexible materials, such as paper or metal foil for example, and to combinations of these materials in the form of coatings, laminates, or multilayers. Also, the invention is not limited to seamless tubes but is applicable to tubes formed, for example, by rolling and seaming sheet material.

For simplicity of explanation and understanding, the seals will be hereinafter illustrated as heat seals made by a conventional bar sealer. It is, of course, within the spirit and scope of this invention to utilize other sealing means, such as ultrasonics, radio frequency heating, infrared heating, glues, solvent adhesives, and the like.

The invention will be more particularly described with reference to the accompanying drawings.

Referring first to FIGURE 2, which illustrates the first step in fabricating the bag of this invention, a parent flattened thermoplastic tubing 30 having folded edges 12 and 12' is intermittently advanced from a supply roll to sealing and cutting and tube-forming stations by conventional means not shown. The tubing 30 is typically a seamless polyethylene tubing 0.003 inch thick with a flat width of 18 inches. At the first station, a heat seal 16 is made in the top of the bag being formed. The heat seal 16 seals together the two walls of the flattened tubing 30 along a line perpendicular to the folded edges and extending across only a major portion of the flat width of the tubing, thus forming a partial closure at that end of the tubing. Simultaneously, with the forming of the heat seal 16, a transverse flap cut 32 is made by slitting both plies of the flattened tubing adjacent to and coextensive with the heat seal 16 so as to form a flap 19 which is integral and continuous with the remainder of the tubing 30. In the embodiment shown in the drawings, the flap cut 32 is spaced about ⅛ inch from the heat seal 16, and runs from the edge fold 12 to terminus at a point 34 spaced intermediate the edge folds 12 and 12'. The heat seal 16 runs from the edge fold 12 to a point 17 adjacent the point 34, and a branch heat seal 15 runs from the point 17 parallel to the edge fold 12' to terminus at a point 17' midway of the flap 19, thus providing a passage 21 to the bag interior.

The bag bottom seal 14 and a cut 36 are made at the same station and at the same time by a combination heat-sealing and cutting head. The heat seal 14 is spaced about ⅛" from cut 36 and seals together the two walls of the flattened tubing 30 along a line perpendicular to the folded edges 12 and 12' and extending across the entire flat width of the tubing 30, thus forming a full closure at that end of the tubing. The cut 36 is spaced about 3" from the cut 32 and severs and separates the previously made bag 31 from the parent tubing 30.

Referring now to FIGURE 3, the partially formed liner bag is advanced to a spout-forming station where a mandrel 38 is inserted interiorly to the tubing 30 through the passage 21 intermediate the edge fold 12' and the heat seal 15. Ready entry of the spout-forming mandrel 38 between the plies of the tubing 30 and into the passage 21 is facilitated by impinging a pulsating jet of air from a central hole 23 in the mandrel 38 onto the edge of the plies comprising flap 19. The center of the spout-forming mandrel 38 comprises the axis of the winding head shown generally as 40. A winding arbor 42 is mounted so as to be independently movable axially and rotatable on the mandrel 38. In turn, the winding arbor 42 has a plurality of shafts 44 swing mounted from brackets 45 about centers 47 and spring loaded with compression springs 49. The shafts 44 mount tube-winding wheels 46 which, when advanced axially into position and rotated, engage and spirally wind the film plies of flap 19 about the surface of mandrel 38 so as to form a tubular spout 18 opening into the tubing 30 through the passage 21.

In the step illustrated in FIGURE 3, the mandrel 38 is shown inserted into passage 21 and winding head 40 is retracted. In the step illustrated in FIGURE 4, the winding head has been advanced and is then rotated, thereby causing tube-winding wheels 46 to engage and spirally wind the plies of flap 19 about mandrel 38, thus forming a tubular spout 18. As they are wound, the adjacent film plies in the spout 18 are heat sealed to each other and to the heat seal 15 by sealing shoes 54, 54′ thus sealing the spout 18 integrally with the body of the bag.

Refer now also to FIGURES 5 and 6. The winding arbor 42 also mounts a bracket 50 as an extension of the arbor flange. The bracket 50 engages a slidable cam member 52 which is actuated by associated linkage, later described, to radially advance and retract the heat-sealing shoes 54, 54′ from the surface of the film flap being wound by the winding wheels 46. The inner surface of the heat-sealing shoes 54, 54′ is curved to fit the surface of the mandrel 38 and is fitted with conventional electrical-resistance heaters (not shown). The heat-sealing shoes 54, 54′ are slidably fitted into bracket 50 by a pair of pins 56 spaced and connected at their outer ends by cam bars 58, 58′. When a cam follower 62 at the other end of the cam member 52 is moved to the right, by movement of a suitable annular cam (not shown), the heat-sealing shoes 54, 54′ are connected to insulated wires 64, 64′ supported by standoffs 66, and the wires run axially through the hub of the arbor 42 and are connected to commutator rings 68, 68′ which are engaged by brushes 70, 70′ and thus connected to an outside power source.

When the flap 19 has been completely wound, the cam follower 62 is moved to the left, thereby retracting the heat-sealing shoes 54, 54′ from the surface of the finished tube. The winding head 40 continues to be rotated while the winding arbor 42 is retracted. The mandrel is then withdrawn from the spout 18 and the bag is completed, to be advanced to a stacking station. The completed bag is shown in FIGURE 1. As can be seen in FIGURE 1, the finished bag comprises a two-ply body portion 10 bounded by two folded edges 12 and 12′, and a full closure formed at one end of the body portion 10 by the heat seal 14 joining together the two plies of the body portion between the two edge folds 12 and 12′, a partial closure formed at the other end of the body portion 10 by the heat seals 16 and 15 joining together the two plies of the body portion between the two edge folds 12 and 12′, and a spout 18 formed by the spirally wound flap 19.

While various specific forms of the present invention have been described herein in some detail, it will be understood that the same are susceptible of numerous modifications. For example, it may be desirable to form more than one spout on the same bag. Also, the location of the spout may be varied, such as by cutting a transverse slit in from each edge fold to form two flaps which can be spirally wound to form a single central spout.

What is claimed is:

1. A method for producing a bag from a flattened flexible tube comprising:
    (a) slitting a first end of said flattened tube transversely to form a flap thereon;
    (b) spirally winding said flap to form a tubular spout opening into said tube;
    (c) sealing together the adjacent layers of said tubular spout;
    (d) sealing said first end of said flattened tube transversely from said spout; and
    (e) sealing the second end of said flattened tube transversely.

2. A method for producing a bag from a flattened flexible tube having two folded edges comprising:
    (a) forming a partial closure at a first end of said flattened tube by sealing together the two walls of the flattened tube along a line extending transversely across only a major portion of the flat width of the tube;
    (b) forming a full closure at the second end of said flattened tube by sealing together the two walls of the flattened tube along a line extending transversely across the entire flat width of the tube;
    (c) slitting both walls of the flattened tube adjacent to and coextensive with said partial closure on the side away from said full closure, thereby forming a flap which is integral and continuous with the remainder of said tube;
    (d) spirally winding said flat so as to form a tubular spout opening into said tube; and
    (e) sealing together the adjacent layers of said spout.

References Cited

UNITED STATES PATENTS 2,998,340  8/1961  Conway et al.
3,183,797  5/1965  Boone _____ 93—8

BERNARD STICKNEY, *Primary Examiner.*

FRANK E. BAILEY, *Examiner.*